United States Patent Office 3,718,605
Patented Feb. 27, 1973

3,718,605
WIDE RANGE COLORIMETRIC REAGENT COMPOSITION FOR CHLORINE
Lester F. M. Storm, Pasadena, Calif., assignor to Sterilizer Control Royalties, North Hollywood, Calif.
No Drawing. Filed Mar. 22, 1971, Ser. No. 126,955
Int. Cl. G01n 31/16
U.S. Cl. 252—408
9 Claims

ABSTRACT OF THE DISCLOSURE

Reagent compositions for colorimetrically measuring the concentration of chlorine in water samples under controlled acid conditions contain ortho tolidine alone, or combinations with lesser proportions of acid fuchsin or acid methyl orange. A wide range of colors results which are better visually differentiated than by single color agents producing only differences in intensity for varying concentrations of chlorine.

BACKGROUND OF THE INVENTION

This invention relates to improved colorimetric reagent composition for measuring the chlorine in water, particularly swimming pool water. The common indicator for this purpose has been ortho tolidine, which when dissolved in water at pH 1.9 or less is colorless if there is no free chlorine. In the presence of chlorine, a yellow color is developed which varies in color density but not in hue, with different concentrations of chlorine. The depth of color is somewhat difficult and inaccurate for visual comparisons with a set of color standards.

Other colorimetric reagents which give varying intensity of one color, for examples dimethyl p-phenylene diamine which produce red colors; 7,8-benzoflavone in the presence of traces of iodine produces blue; orthotoluidine and aniline in acid solution produces blue colors.

SUMMARY OF THE INVENTION

The object of this invention is to provide a colorimetric indicator reagent for chlorine which will produce a wide range of colors (hues) at various levels of chlorine concentration by combining two indicator dyes whose colors for a given chlorine concentration and at a definite pH value blend to form wide color scales of different colors (hues).

DESCRIPTION OF PREFERRED EMBODIMENTS OF THE INVENTION

It has been discovered that ortho tolidine.2HCl produces colors other than yellow if the pH of the indicator and water sample is properly adjusted, as by means of a selected buffering agent. The range of colors which are produced range from colorless at 0 p.p.m. chlorine through blue, green yellow green, olive, brown and orange with increasing concentrations of chlorine.

The dye acid fuchsin in substantial amounts is bleached from magenta to yellow by chlorine. However, when the dye is used in minute amounts, the bleached solution is virtually colorless.

It has been found that when acid fuchsin is used in conjunction with ortho tolidine dihydrochloride, a series of colors starting with red at 0 p.p.m. chlorine, and ranging through purple, violet and blue as the color of the fuchsin was bleached and the blue of the ortho tolidine developed.

A similar effect results from using methyl orange in acid solution along with ortho tolidine, giving a series of colors from orange red, brown, olive green, to emerald green.

A preferred reagent composition for chlorine at a pH in the range of 3.8 to 4.2, contains one part by weight of acid fuchsin to 5 parts by weight of ortho tolidine dihydrochloride. The range of colors produced is indicated in the following color and number chart (Centroid Color ISCC-NBS name and number):

Chart A

| P.p.m. chlorine: | Centroid Color ISCC-NBS name and number |
|---|---|
| 0 | Light purplish Pink, 249 |
| 1 | Very light Purple, 221. |
| 2 | Very pale Violet, 213. |
| 3 | Light Blue, 181. |
| 4 | Light Greenish Blue, 172. |
| 5 | Light Bluish Green, 163. |
| 6 | Brilliant Green, 140. |
| 7 | Very Yellowish Green, 115. |
| 8 | Light Olive, 106. |
| 9 | Medium Olive Brown, 95. |
| 10 | Medium Yellowish Brown, 77. |
| 11 | Deep Orange Brown, 69. |
| 12 | Strong Red Orange, 35. |
| 13 | Very Orange, 48. |

The saturation of the colors in the water sample to be tested will be influenced by the depth of the container cell and the method of viewing.

Further, the range of colors can be compressed or expanded by decreasing or increasing the amount of indicator reagent per unit volume of water to be tested. The reaction of the indicator reagent being strictly stoichiometric, a specific quantity of chlorine will produce a certain definite color in a specific quantity of the indicator reagent.

The relation of the red-purple-violet-blue end of the color range to the blue-green-brown-orange end may also be changed by altering the ratio of acid fuchsin to ortho tolidine.2HCl.

The hydrogen ion (pH) concentration of the water sample to be tested is controlled within the range of about 3.8 to about 4.2 by adding a buffering agent such as aluminum potassium sulfate with the dye mixture. Also it has been found that the addition of an alkali metal bromide to the reagent composition produces more brilliant colors, a portion of the bromine being liberated by the chlorine in the water sample.

The active reagent composition may be varied within the ranges shown below, although the colors produced will vary from those given in Chart A, for particular concentrations of chlorine:

Ortho tolidine.2HCl _ From 4 to 400 parts by weight.
Acid fuchsin _____ From 0.8 to 80 parts by weight.
Potassium bromide __ From 375 to 1500 parts by weight.
Aluminum potassium Sulfate.12H$_2$O ____ From 500 to 2000 parts by weight.

A preferred dry reagent composition is proportioned as follows:

| | Parts by weight |
|---|---|
| Ortho tolidine.2HCl | 40 |
| Acid fuchsin | 8 |
| Potassium bromide | 750 |
| Aluminum potassium sulfate.12H$_2$O | 1000 |
| | 1798 |

The preferred reagent composition may be prepared in several forms, for example, as an aqueous solution, or a dry powder, or as a compressed tablet, or as a printing ink composition, with an added binder and a volatile vehicle liquid.

For a liquid reagent, water to make 100 milliliters of solution may be added to the above dry reagent composition, where parts are measured in milligrams:

Dry ingredients _____ milligrams__ 1798
Water q.s. _____ milliliters____ 100

When 1 milliliter of this liquid reagent is added to a 10 milliliter sample of water to be tested, the color produced will indicate the chlorine concentration as shown by Chart A.

In another form, an absorbent paper such as Whatman's GF/A glass paper may be saturated with the liquid reagent composition described above, and dried. A strip of such paper 3 inches by ½ inch will absorb 0.5 milliliter of the solution. When dried, this "test paper" may be dropped into a 5 milliliter sample of water to give the same colors as obtained with the indicator in the form of the preferred liquid reagent.

The active dry ingredients in the preferred proportions given above may be mixed with a suitable inert excipient (such as sucrose), and divided into compressed tablets or capsules to be added to water samples.

The active ingredients in the stated proportions may be mixed with a binder and a vehicle to form a silk screen ink composition. For example:

| | Parts by weight |
|---|---|
| Acid fuchsin | 8 |
| Ortho tolidine·2HCl | 40 |
| Potassium bromide | 750 |
| Aluminum potassium sulfate·12H$_2$O | 1000 |
| Polyvinyl pyrrolidone | 183 |
| | 1981 |
| Primary amyl alcohol | 2038 |
| Total ink | 4019 |

A printed dot of this ink of sufficient size and thickness to contain 1.981 milligrams (dry weight) will provide the proper amount of reagent to test 1 milliliter of water to determine by the color produced, the concentration of chlorine shown by Chart A.

I claim:

1. A reagent composition for the colorimetric measurement of chlorine concentration in water comprising ortho tolidine·2HCl, aluminum sulfate in a concentration to maintain a pH in the range from about 3.8 to about 4.2, and a small proportion relative to the ortho tolidine·2HCl of a dye selected from the group consisting of acid methyl orange and acid fuchsin.

2. The reagent composition defined in claim 1 in which the dye added to ortho tolidine·2HCl is acid fuchsin.

3. The reagent composition defined in claim 2, in which there is also included an alkali metal bromide.

4. The reagent composition defined in claim 3 in which the proportions of the ingredients are in the ranges:

Ortho tolidine·2HCl _ From 4 to 400 parts by weight.
Acid fuchsin _____ From 0.8 to 80 parts by weight.
Potassium bromide __ From 375 to 1500 parts by weight.
Aluminum potassium sulfate·12H$_2$O ____ From 500 to 2000 parts by weight.

5. The reagent composition defined in claim 4 in which the proportions of the ingredients are:

Ortho tolidine·2HCl ____ About 40 parts by weight.
Acid fuchsin _____ About 8 parts by weight.
Potassium bromide _____ About 750 parts by weight.
Aluminum potassium sulfate·12H$_2$O _____ About 1000 parts by weight.

6. The reagent composition defined in claim 5 to which is added an amount of water sufficient to dissolve the dry ingredients.

7. The reagent composition defined in claim 5 to which is added a water soluble binder.

8. The reagent composition defined in claim 7 in which the binder is polyvinyl pyrrolidone.

9. The reagent composition defined in claim 8 to which is added as a vehicle primary amyl alcohol of about the same weight as the dry ingredients to produce a printing ink of workable consistency.

References Cited

UNITED STATES PATENTS

| | | | |
|---|---|---|---|
| 2,606,102 | 8/1952 | Cook | 23—253 T P |
| 2,784,064 | 3/1957 | Clarke | 23—230 R |
| 3,329,486 | 7/1967 | Rupe | 23—253 T P |
| 2,436,814 | 3/1948 | Leitch | 252—408 |
| 2,385,471 | 9/1945 | Scharer | 23—230 |
| 1,986,403 | 1/1935 | Lehmkahl | 23—230 |
| 2,893,844 | 7/1959 | Cook | 23—253 |
| 3,050,373 | 8/1962 | Collins | 23—253 |
| 3,099,605 | 7/1963 | Free | 195—103.5 |

GEORGE F. LESMES, Primary Examiner

R. E. MARTIN, JR., Assistant Examiner

U.S. Cl. X.R.

23—230 R, 253 T P; 106—22; 260—41 C, 37 P